Figure 5:
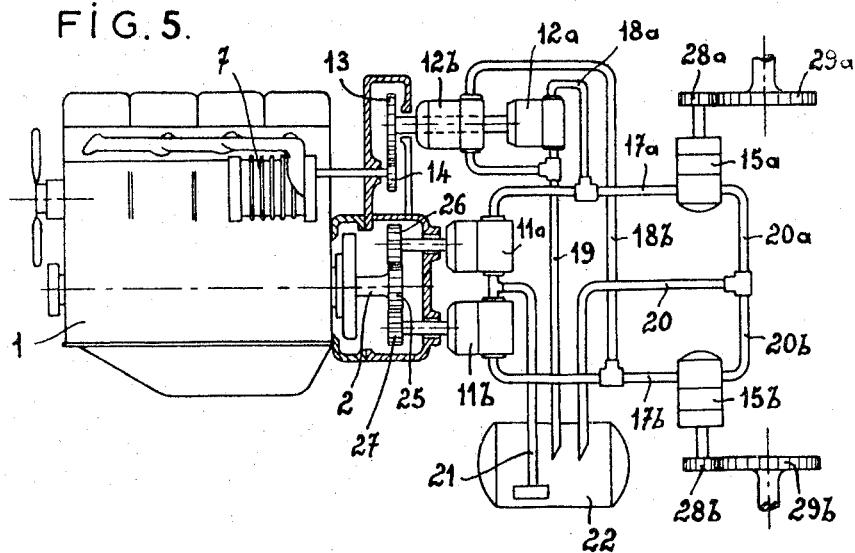

PRIOR ART Fig.1.
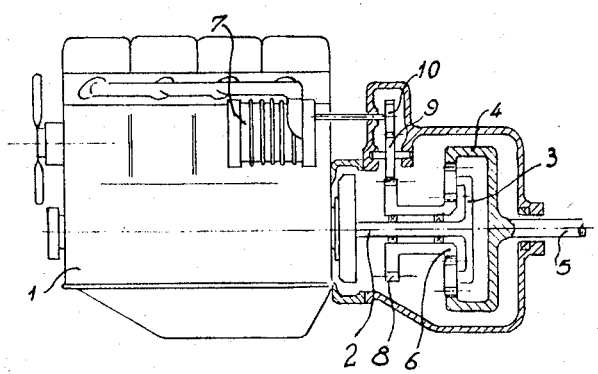
Fig.2.
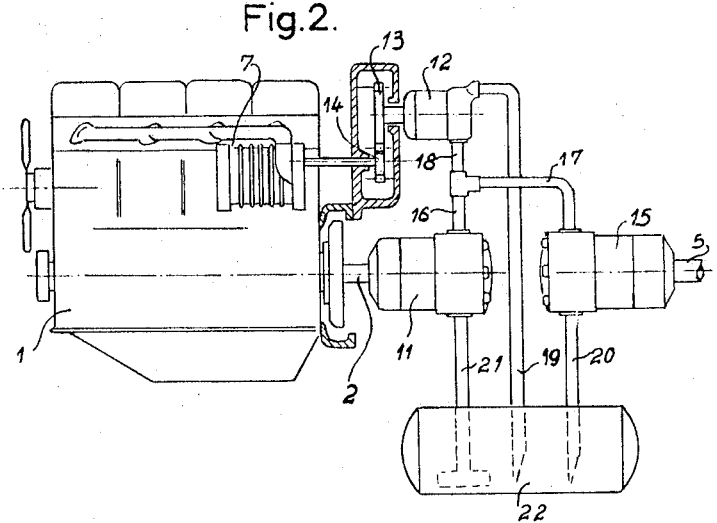

PRIOR ART Fig.3.
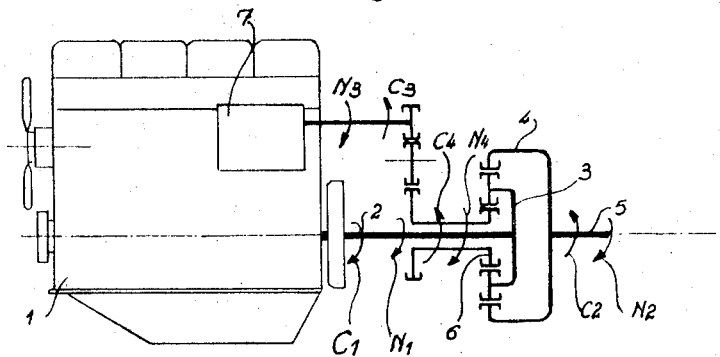
Fig.4.
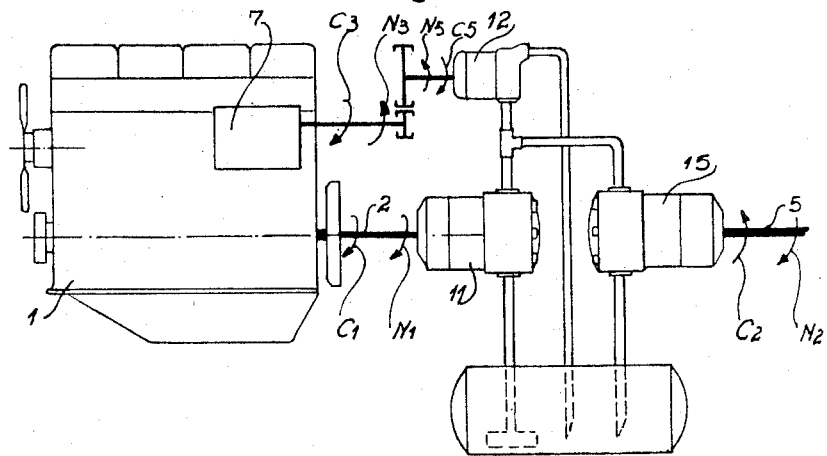

United States Patent Office 3,296,791
Patented Jan. 10, 1967

3,296,791
SYSTEM FOR PROPORTIONALLY SUPER-
CHARGING POWER UNITS
Paul Pierre Richard, Les Buissonnets, Saint-Cyr au Mont
d'Or, Rhone, France, and Jean Louis Joseph Peliat-
Finet, 22 Quai Saint-Vincent, Lyon, Rhone, France
Filed May 20, 1965, Ser. No. 457,336
Claims priority, application France, June 4, 1964,
44,868, Patent 1,406,081; Dec. 15, 1964, 45,399,
Patent 1,427,868
3 Claims. (Cl. 60—19)

The present invention is related to an arrangement including an internal combustion engine followed by one or more main hydraulic transmissions and fed by a supercharger driven in its turn by one or more auxiliary hydraulic engines driven by the same fluid as the main transmission or transmissions, an object of the invention is to adjust the degree of supercharging automatically as a function of the torque required at the output end of the internal combustion engine.

It is well known that, in order to obtain such a result, it is possible to resort to a sun and planet gear of which one member is driven by the internal combustion engine which is generally of the Diesel type, while the two other members drive respectively through the agency of the desired speed-reducing or increasing gears the main transmission and the supercharger respectively.

The torque applied to the different sections, i.e. the heat engine, the compressor and the main transmission are bound by relationships defined by physical laws governing sun and planet gears. The distribution of the speeds between the various members of a sun and planet gear is also obtained in accordance with predetermined physical law. Such an arrangement is designated often as a differential boosting system. The result of such an arrangement consists in obtaining proportionally between the torque acting on the supercharger and the torque supplied by the heat engine so that, consequently, the characteristic properties of the compressor being taken into account, the boost of the heat engine is a function of the torque to be supplied by it. It is thus possible to obtain a particularly favorable characteristic curve for the torque.

It is also well-known that it is possible to transmit the power from an engine to the part or parts to be fed thereby through the agency of a hydraulic transmission including in its simplest embodiment a hydraulic pump driven by the main engine and connected through pipes with one or more hydraulic engines actuating the part or parts to be finally driven. Hydraulic transmissions have particular advantages, such as allowing speed reversal through a crossing of the connections between the pump and the hydraulic engines and also a limitation of the torque through a limitation of the pressure. Hydraulic transmissions also permit easy modification in speed either stepwise or gradually, while enabling the arrangement in an optimum manner of the receiving means, and the elimination of bulky and expensive transmission and friction-exerting parts which are liable to be worn, such as clutches.

The present invention allows retaining, in the case where a hydraulic transmission is used, all the advantages of systems having to a torque distributing sun and planet gear for the drive of a supercharger, but in a much simpler manner. The system improved in accordance with the present invention shows special advantages, both as concerns ease and economy in construction and from an operative standpoint, as will appear from the following description.

The accompanying drawings illustrate diagrammatically by way of example and in a non-limiting sense two embodiments of the invention so as to allow a ready understanding of the scope and nature of the latter.

Figure 6:
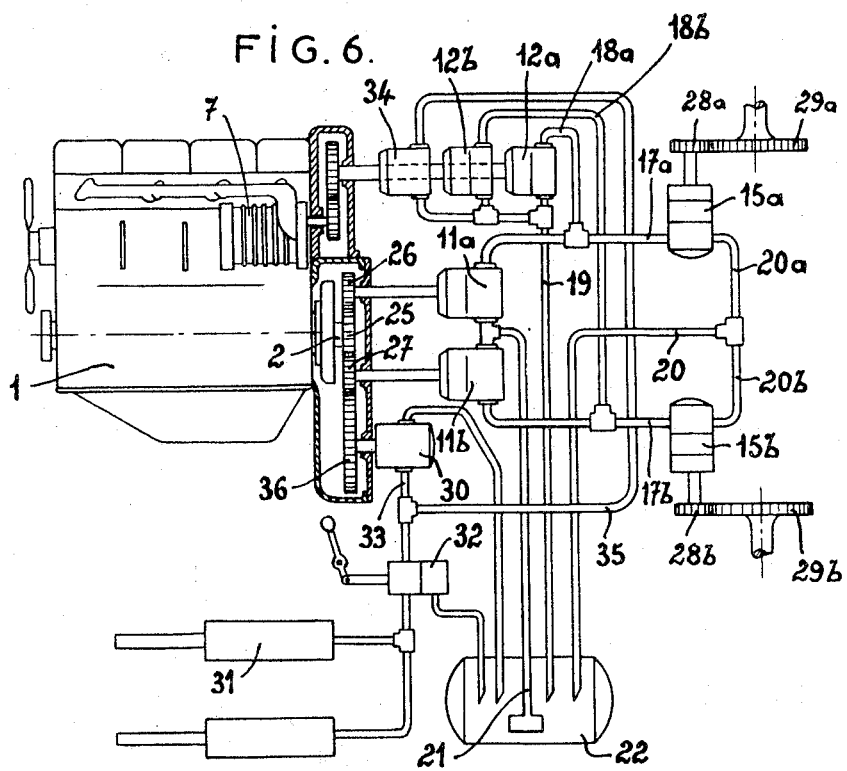

In order to further the understanding of said invention to show the equivalence of the results obtained through different means, there is also illustrated an embodiment of a known arrangement resorting to a sun and planet gear for the distribution of the torques. In said drawings:

FIG. 1 illustrates a known embodiment of an arrangement employing to a torque-distributing sun and planet gear, FIG. 2 illustrates an arrangement according to the invention, FIG. 3 is a view illustrating the known embodiment of FIG. 1 in a diagrammatic manner so as to make the mechanical speed and torque parameters appear clearly, FIG. 4 is similarly a view illustrating in a diagrammatic manner, the arrangement according to FIG. 2 so as to make the mechanical speed and torque parameters appear clearly, FIG. 5 illustrates the arrangement according to FIG. 2 wherein the main transmission is duplicated in order to allow the actuation through the same power unit of two independent receiving means which may assume different speeds under different torque conditions as is the case for caterpillar tractors and the like machines, FIG. 6 illustrates a system similar to that illustrated in FIG. 5 for the case where an auxiliary pump is associated with the arrangement so as to supply a fluid under pressure for the actuation of controlled members such as jacks or the like.

Turning to FIG. 1 illustrating a known arrangement, the power shaft 2 of the engine 1 drives the carrier 3 for the planet wheels of a sun and planet gear.

The outer sunwheel 4 of said gear drives the main transmission shaft 5 driving in its turn the output means, e.g. the wheels of a vehicle with the interposition, if required, of intermediate parts such as clutches, converters, change speed gears and the like. The central sunwheel 6 of the sun and planet gear drives a supercharger 7 feeding air into the engine 1 through the agency of a train of pinions 8, 9 and 10 so as to ensure, on the one hand, the desired speed and torque relationship between the sunwheel 6 and the supercharger 7 driven thereby, taking into account the parameter governing the matching of the supercharger with reference to the engine while said pinions ensure furthermore the optimum location in space of said supercharger.

FIG. 2 illustrates an arrangement in accordance with the invention wherein the driving shaft 2 of the engine 1 drives a hydraulic pump 11 which may be for example of any suitable known type, such as a piston, blade or gear pump.

The booster or supercharger 7 is driven by an auxiliary hydraulic engine 12 which may also be of any suitable known type with the interposition, if required, of gears such as 13 and 14 or of any other transmitting means.

The main transmission shaft 5 is driven by a main hydraulic engine 15 which may also be of any suitable known type.

The fluid under pressure delivered by the pump 11 is sent both into the main hydraulic engine 15 and into the auxiliary hydraulic engine 12 driving the compressor 7 through pipes 16, 17 and 18 in a manner such that the two hydraulic engines 15 and 12 may be fed under the same pressure. Exhaust pipes such as 19 and 20 return the fluid to a container 22 from which the fluid is sucked by the pump 11 via an output pipe 21. Said container may also be eliminated, in which case the fluid passing out of either of the hydraulic engines 12 and 15 returns directly to the suction end 21 of the pump 11. Auxiliary parts such as valves, flap valves limiting the pressure or distributors, allow reversing the direction of rotation of the hydraulic engines or their disconnection if required.

Instead of a main hydraulic engine 15, it is possible to resort to several engines actuated in common by the pump 11. For instance, it is possible to resort to two engines driving respectively the two track-laying caterpillars of a tractor or to four engines driving respectively the four wheels of a vehicle; the engine or engines such as 15 may have a variable cylinder volume so as to provide means for modifying the speed. It is also possible to insert the hydraulic engines in series or in parallel with a view to obtaining various desired results.

The auxiliary engine 12 may also if desired, have a variable cylinder volume, so as to modify correspondingly the distribution of the torques.

Similarly, the pump 11 may also have a variable cylinder volume, but in such a case, certain precautions should be taken, since the adjustment of the cylinder volume of the pump must be associated with an adjustment of the cylinder volume of the engine 12 as will appear from the disclosure given hereinafter.

It is readily proven that the arrangement described with reference to FIG. 2 produces results which are identical with those obtained with the previously known means, such as those illustrated in FIG. 1, but in a simpler manner. Moreover, if by reason of its favourable action, a main hydraulic transmission including a pump such as 11 is already incorporated, together with one or more hydraulic engines such as 15, it would then be sufficient to associate with the arrangement, the auxiliary hydraulic engine 12.

For purposes of consideration of FIGS. 3 and 4, it will be assumed that C1 is the torque acting on the shaft 2 of the engine 1, C2 the torque acting on the transmission shaft 5,
C3 the torque acting on the shaft of the compressor 7,
N1 the speed of the heat engine 1,
N2 the speed of the transmission shaft 5,
N3 the speed of the compressor 7.

It is sufficient to show that the relationships between said torques and said speeds are equivalent in the prior system and in the system according to the invention.

If, in the case of the prior system incorporating a sun and planet gear as described with reference to FIGS. 1 and 3, K1 designates the speed-reducing ratio between the central sunwheel 6 and the compressor 7, K designates the basic ratio of the sun and planet gear, i.e. the ratio between the speed of the sunwheel 4 and the speed of the central sunwheel 6 when the planet carrier 3 is stationary and, assuming C4 designates the torque exerted on the central sunwheel, the following relationships between the torques is obtained $$\frac{C4}{C2}=-K \quad \frac{C2}{C1}=\frac{1}{K-1} \quad \frac{C4}{C1}=\frac{K}{1-K}$$

taking into account the fact that $$C3=\frac{C4}{K_1} \text{ or } C_4=k_1 C3$$

said relationships become $$\frac{k_1 C3}{C2}=-K \quad \frac{C2}{C1}=\frac{1}{K-1} \quad \frac{k_1 C3}{C1}=\frac{K}{1-K}$$

$$\frac{\text{compressor torque}}{\text{transmission torque}}=\frac{C3}{C2}=\frac{-K}{k_1} \quad (1)$$

$$\frac{\text{compressor torque}}{\text{engine torque}}=\frac{C3}{C1}=\frac{K}{k_1(1-K)} \quad (2)$$

$$\frac{\text{compressor torque}}{\text{engine torque}}=\frac{C2}{C1}=\frac{1}{K-1} \quad (3)$$

Furthermore, the following relationship between the speeds in the sun and planet gear is true $$\frac{N_2-N_1}{N_4-N_1}=K$$

$N_4$ being the speed of the central sunwheel 6. Furthermore $$N_4=\frac{N_3}{k_1}$$

It should be noted that K is negative in the example described and this last relationship may be written $N_2=N_1(1-K)+KN_4$ or otherwise $$N_2=N_1(1)+\frac{K}{K_1}N_3 \quad (4)$$

If, in the embodiment according to the present invention and illustrated in FIGS. 2 and 4 the following designations are used:

$C_1$ for the torque on the shaft 2 of the engine 1 and consequently on the shaft of the pump 11,
$N_1$ the speed of the shaft 2 of the engine 1 and consequently of the pump 11,
$C_2$ the torque produced by the hydraulic engine 15 on its output shaft 5 and
$N_2$ the speed of said shaft 5
$C_3$ the torque exerted on the compressor shaft 7
$N_3$ the speed of said engine 7
$C_5$ the torque developed by the auxiliary hydraulic engine 12,
$N_5$ the speed of said engine 12,
$D_1$ the cylinder volume of the pump 11, that is the volume delivered per revolution,
$D_2$ the cylinder volume of the main hydraulic engine 15,
$D_5$ the cylinder volume of the auxiliary hydraulic engine 12
$k_2$ the speed-reducing ratio between the engine 12 and the compressor 7
$p$ the common pressure feeding the engines 12 and 15,
$Q_1$ the output delivered by the pump 11,
$Q_2$ the input sucked in by the hydraulic engine 15,
$Q_5$ the input sucked in by the hydraulic engine 12.

The following relationships are obtained without taking into account the yield and leaks:

$$Q_1=D_1 N_1 \quad Q_2=D_2 N_2 \quad Q_5=D_5 N_5$$

Furthermore, except for a constant factor to be selected in accordance with the measuring units $$C_1=D_1 p \quad C_2=D_2 p \quad C_5=D_5 p$$

or else, taking into account the relationship $$C_3=\frac{C_5}{k_2}$$

$$C_1=D_1 p \quad C_2=D_2 p$$

$$C_D=\frac{D_5}{k_2}$$

It is possible to state the following:

$$\frac{\text{compressor torque}}{\text{couple transmission}}=\frac{C3}{C_2}=\frac{1}{k_2}\frac{D5}{D_2} \quad (5)$$

$$\frac{\text{compressor torque}}{\text{heat engine torque}}=\frac{C3}{C_1}=\frac{1}{k_2}\frac{D5}{D_1} \quad (6)$$

$$\frac{\text{compressor torque}}{\text{heat engine torque}}=\frac{C2}{C1}=\frac{D2}{D1} \quad (7)$$

When comparing said relationships with the relationships (1), (2) and (3) as established hereinabove, it is found that the laws governing the different torques are the same in both types of arrangements, provided the cylinder volumes D1, D2 and D5 are selected as also the speed reducing ratio $k_2$ so as to satisfy the relationships:

$$\frac{1}{k_2}\frac{D5}{D2} = \frac{-K}{k_1} \quad (8)$$

$$\frac{1}{k_2}\frac{D5}{D1} = \frac{K}{k_1(1-K)} \quad (9)$$

$$\frac{D2}{D1} = \frac{1}{K-1} \quad (10)$$

This may be ensured in various manners. It is possible for instance to define the cylinder volume D1 of the pump 11, in accordance with the maximum allowable pressure $p$ and the power to be transmitted after which the cylinder volume of the auxiliary hydraulic engine 12 is selected in accordance with the power; the speed relationship $k_2$ is defined by:

$$k_2 = \frac{K_1(1-K)}{K}\frac{D5}{D1}$$

It is an easy matter to show that the relationships between the speeds are also identical in both systems.

As a matter of fact, it can be stated that the sum of the inputs sucked in by the hydraulic engines 12 and 15 is equal to the output generated by the pump 11, in other words, considering that the algebraic sum of the volumes sucked in and absorbed is equal to zero, $$Q_1 + Q_2 + Q_5 = 0$$

this leads to $$D_1 N_1 + D_2 N_2 + D_5 N_5 = 0$$

Since $$N_3 = k_2 N_5$$

$$D_1 N_1 + D_2 N_2 + \frac{D5 N3}{k_2} = 0$$

which may be written $$N_2 = -\frac{D1 N1}{D2} - \frac{D5}{D2}\frac{N3}{k_2}$$

the relationships (10) and (8), established precedingly so as to define the balance between the torques show that $$\frac{D1}{D2} = K - 1 \frac{D5}{D2} = \frac{-Kk_2}{k_1}$$

By transferring these values into the above relationship, the latter becomes $$N_2 = (1-K)N_1 + \frac{K}{k_1}N_3$$

which expression is identical with the relationship (4) established hereinabove for the case of a sun and planet gear, said expression defining the relationship between the relative speed of the engine, of the transmission shaft and of the compressor. The result obtained by the system according to the present invention is thus identical with that obtained by the prior system based on the use of a sun and planet gear, both as concerns the distribution of the torques and as concerns the speeds obtained.

The present invention permits the elimination of the costly sun and planet gear which is of delicate construction and which is often the source of vibrations corresponding to exchanges of kinetic energy and thus said invention offers considerable advantages.

It furthermore allows locating in an optimum manner the different parts of the arrangement which are connected by pipes instead of by transmission shafts.

It is important furthermore to note that the invention provides certain further advantages.

In particular, the ratio between the torque C3 exerted on the shaft of the compressor 7 and the torque C1 exerted on the shaft of the engine 1 is governed by the above-disclosed relationship $$\frac{C3}{C1} = \frac{1}{k_2}\frac{D5}{D_1} \quad (6)$$

This relationship shows that, with the use of a hydraulic engine 12 of which the cylinder volume, that is the output per revolution D5 may be adjusted, it is possible to modify the ratio $C3/C1$, which may allow matching in a simple manner the boosting of the engine, as required for various applications or else adjusting readily said boosting in an optimum manner and as required The modifications of the cylinder volume of the engine 12 may be controlled by hand or else by automatic regulators sensitive to various parameters, such as the hydraulic pressure.

It should also be noted that it is possible to make the speed N2 of the engine 15 vary by using a pump 11 having a variable cylinder volume D1. In this case, if it is desired to satisfy the relationship (6) defining the balance between the torques C3 on the compressor 7 and C1 on the shaft of the heat engine 1, and consequently the adjusted value of the boosting, it is sufficient to associate the modifications in the cylinder volumes of the pump 11 and of the auxiliary hydraulic engine 12 so as to maintain the ratio $D5/D1$.

Thus, the adjustment of the boosting is not disturbed, whereas the ratio between the torque C2 exerted on the transmission and the torque C1 exerted by the engine is modified as a consequence of the modifications in the cylinder volume D1 of the pump C1, as shown by the relationship 7.

$$\frac{C2}{C1} = \frac{D2}{D1} \quad (7)$$

It will be furthermore noted that the boosting adjusted in relationship with the driving torque is not disturbed, provided the cylinder volume D2 is modified in accordance with the rotation of the engine or engines such as 15 since the parameter D2 does not interfere with the relationship (6) which defines the balance between the torques C3 at the compressor and C1 at the heat engine.

The present invention is also applicable to the case where it is desired to replace the hydraulic transmission precedingly described and provided with a single main pump 11 by a double or even multiple hydraulic transmission, as may be required on a track-laying tractor or the like machine, wherein the steering is obtained by means of a difference in speed between the caterpillars or the wheels located to either side of the vehicle.

The use of two independent hydraulic transmissions for the control of the speeds of the corresponding track-laying caterpillars or wheels is of an obvious interest. As a matter of fact, whereas it is possible to readily imagine the feeding, with fluid under pressure out of a hydraulic pump, of two hydraulic engines actuating respectively the two track-laying caterpillars or the two sets of lateral wheels of a vehicle while the modification in speed of each of said track-laying caterpillars or set of wheels is obtained through a modification in the operative conditions of either of said hydraulic engines, for instance by modifying their cylinder volume, such an arrangement shows however serious drawbacks. In such an arrangement, the pressure thus produced by a single pump is the same for the two hydraulic engines, which implies that if it is desired to increase the torque for one of the engines, it is necessary to increase its cylinder volume and this leads under otherwise unvarying conditions to a reduction in its speed.

The distribution of the fluid under pressure passing out of a single pump between the two hydraulic engines is performed in an uncontrolled manner, since it is governed only by the torques applied respectively to the two engines, so that the corresponding speeds cannot be adjusted accurately and consequently the steering radius of the vehicle is not positively defined.

The setting of one of the hydraulic engines out of the circuit implies the delivery of the entire fluid volume into the other engine, since the pressure cannot be rendered equal to zero, and consequently this leads to a duplication of the speed of the engine remaining in the circuit while the conditions are otherwise unchanged, which duplication is generally not advisable.

It is therefore of advantage to provide two independent transmissions each including a pump and a hydraulic engine, which allows communicating to each of the track-laying caterpillars or to each set of lateral wheels the desired predetermined speed, the pressure prevailing in the two transmissions being different.

FIG. 5 illustrates such an arrangement in conformity with the invention for the case where two independent main transmissions are required, while the above-disclosed principles are complied with and in particular the torque applied to the compressor remains proportional to the torque produced by the engine.

In the embodiment thus illustrated in FIG. 5, the supercharger feeding the engine is driven by two hydraulic engines, the torques produced by which are added together; said hydraulic engines are fed respectively by the same fluid as the corresponding main transmissions under the same pressure as that of said corresponding main transmissions, the output of each of the two pumps being distributed between the two main hydraulic engines and the corresponding auxiliary engines driving the compressor.

In FIG. 5, the shaft 2 of the engine 1 drives, through the gears 25, 26 and 27, the two pumps 11a and 11b feeding compressed fluid into the two corresponding hydraulic engines 15a and 15b to which they are connected through the pipes 17a and 17b.

Said pumps 11a and 11b suck in fluid out of a common container 22 through a common pipe 21 into which the engines 15a and 15b return the fluid through pipes such as 20a and 20b.

The two hydraulic engines 15a and 15b each drive the corresponding track-laying caterpillar or the corresponding set of lateral wheels through the agency of gears 28a, 29a and 28b, 29b.

The compressor 7 which feeds air into the engine 1 is controlled by two auxiliary hydraulic engines 12a and 12b, the torques produced by which are added together so as to drive the pinion 13 meshing with the pinion 14 keyed to the shaft of the compressor 7.

The auxiliary hydraulic engine 12a is connected through a branch pipe 18a with the pipe 17a feeding fluid under pressure out of the pump 11a into the main hydraulic engine 15a. Similarly, the auxiliary hydraulic engine 12b is connected through a branch pipe 18b with the pipe 17b connecting the pump 11b with the other main engine 15b.

The exhaust ends of the hydraulic engines 12a and 12b are connected through the above-mentioned pipe 19 with the container 22.

Assuming $k_2$ designates the speed reducing ratio between the auxiliary hydraulic engines 12a and 12b and the compressor 7:

$k_3$ the speed reducing ratio between the shaft 2 of the engine 1 and either of the pumps 11a and 11b, $D1a$ and $D1d$ the cylinder volumes of the pumps 11a and 11b respectively, $D1a$ and $D1d$ the cylinder volumes of the pumps 11a and 11b respectively, $D2a$ and $D2b$ the cylinder volumes of the main hydraulic engines 15a and 15b respectively, $D5a$ and $D5b$ the cylinder volumes of the auxiliary hydraulic engines 12a and 12b respectively, $P_a$ and $P_b$ the pressures of the fluids delivered by the pumps 11a and 11b respectively, $C1$ the torque exerted on the shaft 2 of the engine 1, $C3$ the torque exerted on the shaft of the compressor 7 by the auxiliary hydraulic engines 12a and 12b, It is possible, by calculating in the manner already disclosed, to obtain the relationship:

$$\frac{\text{compressor torque}}{\text{torque of the engine}} = \frac{C3}{C1} = \frac{1}{k2k3} \frac{D5apa + D5bpb}{D_{1a}p_a + D_{1b}p_b}$$

If through the actual execution of the arrangement
$$D_{5a} = D_{5b} = D_5$$
and
$$D_{1a} = D_{1b} = D_1$$

said relationship becomes in this case $$\frac{C3}{C1} = \frac{1}{k2k3} \frac{D5(pa+pb)}{D1(pa+pb)} = \frac{1}{k2k3} \frac{D5}{D1}$$

which shows that the ratio between the torque applied to the compressor or supercharger and the torque to be produced by the heat engine remains constant whatever may be the pressures $pa$ and $pb$ prevailing respectively in the two transmissions.

It is possible also to show that the corresponding speeds $N2a$, $N2b$ of the hydraulic engines 15a and 15b in the case where the pumps 11a and 11b have equal outputs are governed by the relationship:

$$\frac{N_{2a}}{N_{2b}} = \frac{D_{2b}}{D_{2a}}$$

which shows the possibility of perfectly controlling the steering by modifying the cylinder volumes $D2a$, $D2b$.

It is also possible to cut out the pressure in the circuit of one of the hydraulic engines 15a or 15b and consequently to cut out the torque exerted by it, without this having any effect on the other engine, while proportionality is ensured between the boosting and the torque exerted by the heat engine.

The hydraulic engine which is no longer fed may even be set in its braking condition corresponding to its operation as a pump. Furthermore and more generally, the arrangement described with reference to FIG. 5 associates with its particular properties, the possibilities and advantages disclosed precedingly with reference to the arrangement illustrated in FIG. 4.

FIG. 6 relates to an arrangement similar to that illustrated in FIG. 5 but further includes an auxiliary pump 30 adapted to feed controlled apparatus, such for instance as jacks 31 brake circuits or clutch circuits associated, if required, with the use of distributors such as 32.

The auxiliary pump 30 is driven by the shaft 2 of the heat engine 1 through the agency of toothed wheels such as 27 and 36. It feeds the controlled circuit through a pipe 33 which also feeds a further auxiliary hydraulic engine 34 through a shunt pipe 35. The torque of the auxiliary hydraulic engine 34 is added to that of the auxiliary engines 12a and 12b.

It may be shown as precedingly that, if $D5c$ designates the cylinder volume of the engine 34 and $D6$ the cylinder volume of the pump 30, $k6$ the speed reducing ratio between the shaft 2 and the pump 30, $p6$ the pressure of the fluid delivered by the pump 30, the following equation is true:

$$\frac{\text{compressor torque}}{\text{heat engine torque}} = \frac{C_3}{C_1} = \frac{1}{k2} \frac{D_5(p_a+p_b) + D_{5c}p_6}{k_3 D_1(p_a+p_b) + k_6 D_6 p_6}$$

and consequently, if the arrangement is such that
$$D_{5c} = D_5$$
$$k3D_1 = k6D_6$$

$$\frac{\text{compressor torque}}{\text{heat engine torque}} = \frac{D_5(p_a+p_b+P_6)}{k2k3D_1(pa+p_b+P_6)} = \frac{1}{k2k3} \frac{D_5}{D_1}$$

so that said ratio is independent of $p_a$, $p_b$ and $p6$.

If necessary, it is also possible to drive two or more and generally any number of auxiliary pumps by associating with each of them an auxiliary hydraulic engine such as 34 so as to apply to the supercharger or compressor, a further torque proportional to the further torque applied to the shaft of the engine.

The improved system according to the invention offers not only all the advantages provided by the known systems incorporating a sun and planet gear for the distribution of the torques between the parts to be driven and the supercharger feeding the engine, but furthermore it shows the particular advantages of simplicity, mechanical strength and easy arrangement of the different component parts.

It also allows benefiting by the advantages inherent to hydraulic transmissions and chiefly by that of ensuring a gradual modification, if desired, of the ratio between the useful torque and the driving torque. It allows lastly an easy and gradual modification of the ratio between the torque absorbed by the supercharger and the torque produced by the heat engine or even the useful torque.

Adjusting means, sensitive to the fluid throughput or to the pressure, may be associated with the arrangement forming the object of our invention with a view towards modifying the adjustment of the cylinder volumes of the engines and pumps or else for acting on the adjustment of the fuel feeding the internal combustion engine. Preferably control is effected by the hydraulic pressure in the circuit of the hydraulic engines. In particular, the hydraulic pressure prevailing in the circuit of the hydraulic engines may act on the fuel delivered by the fuel injecting pump to the Diesel engine 1 with a view to controlling the input of fuel by said pressure and consequently by the output of the compressor 7.

What we claim is:

1. A power unit comprising a heat engine, a supercharger for continuously feeding said heat engine, at least one hydraulic pump driven by the heat engine, at least one main hydraulic engine, a hydraulic circuit connecting said pump with said hydraulic engine, at least one auxiliary hydraulic engine driving the supercharger and means whereby said auxiliary hydraulic engine is fed by said circuit under the same pressure as the main hydraulic engine to provide constant proportionality between the output of the supercharger and the output of the heat engine.

2. A power unit comprising a heat engine, a supercharger for continuously feeding said heat engine, two hydraulic pumps driven by the heat engine, two main hydraulic engines, a hydraulic circuit connecting said pumps with said hydraulic engines, two auxiliary hydraulic engines driving the supercharger and means whereby said auxiliary hydraulic engines are fed by said circuit under the same pressure as the main hydraulic engines to provide constant proportionality between the output of the supercharger and the output of the heat engine.

3. A power unit comprising a heat engine, a supercharger feeding said heat engine, at least one hydraulic pump driven by the heat engine, at least one main hydraulic engine, at least one auxiliary hydraulic engine driving the supercharger and means whereby said auxiliary hydraulic engine is fed under the same pressure as the main hydraulic engine and a further hydraulic pump driven by the heat engine, controlled means fed by said further pump and a further auxiliary hydraulic engine fed by said further pump under the same pressure as the controlled means and cooperating with the auxiliary hydraulic engine in the drive of the compressor.

References Cited by the Examiner

UNITED STATES PATENTS

| 1,346,124 | 7/1920 | Guerlich | 60—13 |
| 2,841,963 | 7/1958 | Schjolin et al. | 60—19 X |
| 2,988,890 | 6/1961 | Oishei et al. | 60—52 X |
| 3,088,413 | 5/1963 | Johnson | 60—19 X |
| 3,104,528 | 9/1963 | Horig | 60—6 X |
| 3,187,497 | 6/1965 | Granryd | 60—19 |

FOREIGN PATENTS

| 124,793 | 4/1919 | Great Britain. |

EDGAR W. GEOGHEGAN, *Primary Examiner.*